(12) United States Patent
Fiedler

(10) Patent No.: US 7,261,301 B2
(45) Date of Patent: Aug. 28, 2007

(54) OIL SCRAPER RING FOR PISTONS OF INTERNAL COMBUSTION ENGINES

(75) Inventor: Rolf-Gerhard Fiedler, Wendlingen (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/570,090

(22) PCT Filed: Sep. 2, 2004

(86) PCT No.: PCT/DE2004/001962

§ 371 (c)(1),
(2), (4) Date: Jun. 1, 2006

(87) PCT Pub. No.: WO2005/024278

PCT Pub. Date: Mar. 17, 2005

(65) Prior Publication Data

US 2007/0018410 A1   Jan. 25, 2007

(30) Foreign Application Priority Data

Sep. 2, 2003  (DE) ................................. 103 40 301

(51) Int. Cl.
*F16J 9/20* (2006.01)

(52) U.S. Cl. ................. 277/434; 277/449; 277/466

(58) Field of Classification Search ............... 277/434, 277/435, 466, 449, 454, 447
See application file for complete search history.

(56) References Cited

U.S. PATENT DOCUMENTS

| 2,844,427 A | * | 7/1958 | Muller et al. ............... 277/436 |
|---|---|---|---|
| 3,554,568 A | * | 1/1971 | Heid ........................... 277/452 |
| 4,909,520 A | * | 3/1990 | Gallagher .................... 277/436 |
| 5,618,046 A | * | 4/1997 | Binford ....................... 277/464 |
| 7,044,473 B1 | * | 5/2006 | Zhu et al. .................... 277/459 |
| 2002/0033579 A1 | * | 3/2002 | Ishida ......................... 277/434 |
| 2006/0273525 A1 | * | 12/2006 | Fiedler ........................ 277/434 |
| 2007/0017459 A1 | * | 1/2007 | Fieldler ..................... 123/48 A |

FOREIGN PATENT DOCUMENTS

| DE | 33 05 385 | | 3/1984 |
|---|---|---|---|
| DE | 38 33 322 | | 12/1989 |
| DE | 43 00 531 | | 2/1994 |
| DE | 44 29 649 | | 2/1996 |
| FR | 2723401 | | 2/1996 |
| GB | 2002874 | * | 8/1977 |
| JP | 57-73340 | | 5/1982 |
| JP | 57 176344 | | 10/1982 |
| JP | 04 050554 | | 2/1992 |
| JP | 08 028347 | | 1/1996 |
| JP | 09 257130 | | 9/1997 |

\* cited by examiner

*Primary Examiner*—Alison K. Pickard
(74) *Attorney, Agent, or Firm*—Collard & Roe, P.C.

(57) ABSTRACT

The invention relates to an oil scraper ring for pistons of internal combustion engines, said oil scraper ring comprising a disc (1) provided with a bearing surface (h) having an asymmetrical crowned form with a vertex line (3) extending over the periphery of the disc. Said disk (1) is arranged in a ring groove (7) of the piston and respectively has a ring groove side (6) opposing the piston head and a parallel ring groove side (5) facing the piston head. The aim of the invention is to achieve an improved oil scraping action compared to that of prior art, while reducing the friction and the abrasion of the bearing surface.

3 Claims, 1 Drawing Sheet

OIL SCRAPER RING FOR PISTONS OF INTERNAL COMBUSTION ENGINES

CROSS REFERENCE TO RELATED APPLICATIONS

Figure 1:
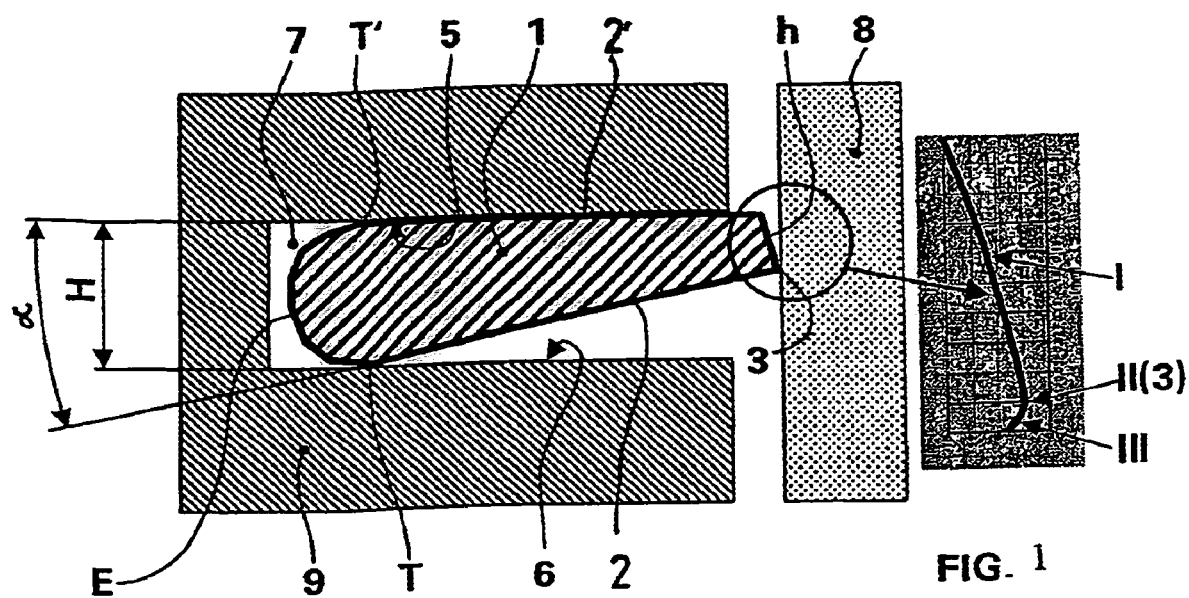

Applicant claims priority under 35 U.S.C. §119 of German Application No. 103 40 301.9 filed Sep. 2, 2003. Applicant also claims priority under 35 U.S.C. §365 of PCT/DE2004/001962 filed Sep. 2, 2004. The international application under PCT article 21 (2) was not published in English.

The invention relates to an oil wiping ring for pistons of internal combustion engines, consisting of a lamella whose working surface has a barrel-shaped asymmetrical shape, having a vertex line that extends over the circumference of the lamella, whereby the lamella is disposed on a ring groove of the piston, having one wall facing away from the piston crown side and one wall facing the piston crown side, disposed parallel to one another, in each instance.

In order to prevent too much motor oil from getting into the combustion chamber, which not only results in high oil consumption but also has negative effects on the emission behavior of the engine, a sufficient tangential force of the oil wiping rings is required to produce a radial contact pressure against the cylinder wall and thereby a good oil wiping effect. However, this results in a high surface pressure against the working surfaces of the lamellae, and therefore a high friction power during engine operation. This friction power worsens the degree of effectiveness of the internal combustion engine and accordingly increases the fuel consumption. The design of the tangential force of the oil wiping rings is therefore always a compromise between minimal friction power and maximal oil wiping effect. All of the measures for reducing the friction power during engine operation, without reducing the tangential force, thereby facilitate the design of the oil wiping rings, i.e. improve the degree of effectiveness of the engine.

Accordingly, an attempt was made, for oil wiping rings of the type stated, to shape the working surface of the lamella in such a manner that these meet the aforementioned requirements.

Asymmetrical working surfaces of oil wiping rings or piston rings are known from DE 38 33 322 A1, DE 43 00 531 C1, or DE 44 29 649 C2. Likewise, a piston ring is known from DE 33 05 385 C1, which is disposed in a ring groove of a piston, the ring groove side walls of which run preferably parallel, but at a slant to the piston axis, in order to guarantee a better seal. Ring groove side walls that are oriented at a slant and parallel to one another are also known from the Japanese utility model 57-73340. These previously known embodiments, however, relate to compression rings, whose requirements with regard to surface pressure are very low, while oil wiping rings demand great surface pressures.

It is the task of the present invention to indicate a one-part oil wiping ring for a piston of an internal combustion engine, which has an improved oil wiping effect as compared with the known state of the art, at reduced friction and a reduced wear of the running surface.

This task is accomplished by means of the characteristics of the characterizing part of claim 1.

The working surface of the lamella is characterized by a greatly reduced barrel shape as compared with the state of the art, whereby the working surface contour can be approximately described by means of a polynomial of the second order.

By means of the working surface and wall configuration of the lamella in the ring groove, according to the invention, a reduction in the friction power of the oil wiping ring is achieved, by means of a more advantageous hydrodynamic condition at the lamella, without any reduction in tangential force, whereby the oil wiping function of the lamella is maintained to its full extent, in this connection. The reduction in the friction power results in an improvement of the degree of effectiveness of the engine, or the oil wiping behavior can be improved by means of an increase in the tangential force, with an unchanged friction power level.

Practical embodiments of the invention are the subject of the dependent claims.

An exemplary embodiment of the invention is described below, using the single drawing. FIG. 1 shows a cross-section of the oil wiping ring according to the invention, in a ring groove of a piston.

As is evident from the figure, a lamella 1 is disposed in a ring groove 7 having a ring groove wall 5 that faces the piston crown, and a ring groove wall 6 that faces away from the piston crown. According to the invention, the lamella 1 has a barrel-shaped asymmetrically shaped working surface h with a vertex line 3 that extends over the circumference of the lamella, whereby the vertex line 3 acts for oil wiping, as an edge that stands in contact with the cylinder wall 8. In the exemplary embodiment, the lamella 1 is disposed in the piston, in its assembled state, in such a manner that the vertex line 3 of the working surface h is disposed towards the ring groove wall 6 that faces away from the piston crown side.

The lamella 1 has lamella walls 2 and 2' that run radially outward up to the working surface h, at an angle α, converging towards one another in such a manner that when the wall 2 makes contact with the ring groove wall 5 that faces the piston crown side, the lamella stands in contact with the cylinder wall 8 of the engine only with the vertex line 3. In this connection, an angle between the ring groove wall 6 that faces away from the crown side and the lamella wall 2' of preferably 3° to 5° degrees is formed. The lamella walls 2 and 2', which extend radially inward, are connected with an end surface E, whereby tangential points T are produced by the end surface, which points form the point of rotation of the lamella, corresponding to the stroke movement of the piston. As shown in the figure, the entire end surface E can be configured in the shape of a semi-circle. Any desired shape of the end surface is possible, as long as the end surface is configured as a semi-circle directly at the point of rotation. The axial expanse of the end surface essentially corresponds to the height H of the ring groove 7, whereby the insertion of the lamella into the ring groove 7 is still made possible.

When the lamella walls 2, 2' make contact with the ring groove wall 6 that faces away from the piston crown side, the lamella 1 enters into contact with the cylinder wall only with the first segment (I) of the working surface (h). According to the invention, the working surface h of the lamella has a shape that corresponds to a run-in process of several hundred hours of engine operation. This is characterized in that the working surface h, in cross-section, follows the asymmetrical shape of a polynomial of the second order in a first segment (I), with $h(x)=ax+bx^2$, whereby x=working surface coordinates in the Cartesian coordinate system in mm, and a, b are coefficients, with a being defined by the ratio of the axial wall play of the lamellae relative to the width of the lamellae; b being defined as the amount of the working surface curvature; a supporting vertex (II) $h(x=0)$ configured as an edge 3, and in a third segment (III) follows the asymmetrical shape of the function $h(x)=cx^2$, with c as a multiple of b. As an example for lamellae having a thickness of 0.4 mm, a value $h(x)=35x+50x^2$ is obtained. With this, the cross-section curves shown in accordance with FIG. 1 can be achieved, with x as the working surface coordinate in mm, and h(x) as the barrel shape in µm. It is understandable that the coefficients of this polynomial must be coordinated with the specific application, whereby essential parameters in this connection are the cylinder diameter, the dimensions of the lamella cross-section, and the axial play ratios of the installed oil wiping ring in the ring groove. The typical barrel shape of the working surface h according to the invention amounts to approximately 2 to 10 µm/0.4 mm, according to the invention, as compared with the embodiments according to the state of the art of 3 to 15 µm/0.15 mm.

Functionally, the oil wiping effect that is improved according to the invention results from the fact that the friction force that engages on the working surface h of the lamella in the cylinder axis direction generates a torque that causes the lamella to arch in plate shape. This is possible because the configuration of the lamella walls 2 and 2' prevents a movement of the lamella in the axial direction, whereas clearly greater axial movement amplitudes are possible at the outer contact point.

The friction force, and therefore the torque, changes its sign as a function of the stroke direction of the piston. Since the amount of the friction force is still dependent on velocity, this results in a constant change in the plate-shaped arch, referred to as dynamic twist. Because of the dynamic twist, the lamella that rests against the groove wall that faces the piston head during the stroke away from the combustion chamber—the down stroke—in combination with the asymmetrical incline of the working surface, produces a good oil wiping effect—the "edge" works—while the other position of the lamella, in each instance, has improved hydrodynamics because of the defined barrel shape of the working surface—the "surface" (segment I) works. In this way, the friction power at the lamella, which has a worse oil wiping effect in the twisted state, is reduced. A change in the stroke direction causes the lamella to flip over into the other position, in each instance.

Attention must be paid to ensure orientation of the lamella in the correct position when the oil wiping ring is installed; this can be guaranteed, for example, by means of color markings on the lamella walls.

The production of the working surface shape, i.e. contour can take place by means of lapping, for example.

| | Reference Symbols |
|---|---|
| 1 | lamella, oil wiping ring |
| 2, 2' | lamella walls |
| 3 | vertex line (edge) |
| 5 | ring groove wall facing the piston crown side |
| 6 | ring groove wall facing away from the piston crown side |
| 7 | ring groove |
| 8 | cylinder wall |
| 9 | piston |
| E | end surface |
| h | working surfaces |
| H | height of the ring groove |
| T | tangential point |

The invention claimed is:

1. Oil wiping ring for pistons of internal combustion engines, consisting of a lamella (1) whose working surface (h) has a barrel-shaped asymmetrical shape, having a vertex line (3) that extends over the circumference of the lamella, whereby the lamella (1) is disposed in a ring groove (7) of the piston, having one ring groove wall (6) facing away from the piston crown side and one ring groove wall (5) facing the piston crown side, disposed parallel to one another, in each instance,
   wherein
   the lamella walls (2, 2') run radially outward up to the working surface (h), at an angle (α), converging towards one another in such a manner that when one of the walls makes contact with the ring groove wall (5) that faces the piston crown side, the lamella stands in contact with the cylinder wall (8) of the engine only with the vertex line (3), and when one of the lamella walls makes contact with the ring groove wall (6) that faces away from the piston crown side, the lamella stands in contact with the cylinder wall only with the first segment (I) of the working surface (h), whereby the working surface (h) of the lamella (1), in cross-section,
   follows the asymmetrical shape of a polynomial of the second order in a first segment (I), with $h(x)=ax+bx^2$, whereby
   x=working surface coordinates in the Cartesian coordinate system in mm, and a, b are coefficients, with a being defined by the ratio of the axial wall play of the lamellae relative to the width of the lamellae; b being defined as the amount of the working surface curvature;
   a supporting vertex (II) h(x=0) configured as an edge, and in a third segment (III) follows the asymmetrical shape of the function $h(x)=cx^2$, with c as a multiple of b.

2. Oil wiping ring according to claim 1, wherein in the assembled state of the oil wiping ring (1) in the piston, the vertex line (3) of the working surface (h) is disposed towards the ring groove wall (6) that faces away from the piston crown side.

3. Oil wiping ring according to claim 1, wherein the lamella walls (2, 2'), which extend radially inward in the ring groove (7), are connected by means of an end surface (E), which forms tangential points (T) for a rotary movement of the lamella, corresponding to the stroke movement of the piston.

* * * * *